(12) United States Patent
Jeong et al.

(10) Patent No.: US 7,145,662 B2
(45) Date of Patent: Dec. 5, 2006

(54) METHOD FOR MEASURING THICKNESS OF AN OPTICAL DISC

(75) Inventors: Seong Yun Jeong, Seoul (KR); Jin Yong Kim, Seongnam-si (KR); Jin Hong Kim, Yongin-si (KR); Hun Seo, Yongin-si (KR); Keum Cheol Kwak, Seoul (KR)

(73) Assignee: LG Electronics, Inc., Seoul (KR)

( * ) Notice: Subject to any disclaimer, the term of this patent is extended or adjusted under 35 U.S.C. 154(b) by 89 days.

(21) Appl. No.: 10/633,639

(22) Filed: Aug. 5, 2003

(65) Prior Publication Data
US 2004/0257583 A1 Dec. 23, 2004

(30) Foreign Application Priority Data
Jun. 20, 2003 (KR) .................. 10-2003-0040312

(51) Int. Cl.
G01B 9/02 (2006.01)
G01B 11/28 (2006.01)

(52) U.S. Cl. .................. 356/504; 356/630

(58) Field of Classification Search .......... 356/503, 356/504, 630–632; 250/559.19, 559.27, 250/559.28
See application file for complete search history.

(56) References Cited

U.S. PATENT DOCUMENTS 4,905,170 A * 2/1990 Forouhi et al. ........... 356/631
5,227,861 A * 7/1993 Nishizawa et al. ........ 356/497
5,440,141 A * 8/1995 Horie ................... 250/559.27
5,493,401 A * 2/1996 Horie et al. ............. 356/632
6,172,756 B1 * 1/2001 Chalmers et al. ......... 356/630
6,236,459 B1   5/2001 Negahdaripour et al.
6,392,756 B1 * 5/2002 Li et al. ................. 356/632
6,826,511 B1 * 11/2004 Mikkelsen et al. ........ 702/172
2002/0163649 A1  11/2002 Hirose et al.
2004/0027580 A1 * 2/2004 Bosser et al. ............ 356/504
2006/0082786 A1 * 4/2006 Kim et al. ............... 356/504

FOREIGN PATENT DOCUMENTS
WO    03/025497 A1    3/2003

* cited by examiner

Primary Examiner—Gregory J. Toatley, Jr.
Assistant Examiner—Patrick Connolly
(74) Attorney, Agent, or Firm—Harness, Dickey & Pierce, P.L.C.

(57) ABSTRACT

A method of measuring thickness of an optical disc by using an interference effect of the optical disc layer is disclosed. The method includes detecting an intensity of a reflective light according to a wavelength of a light as spectrum data for each wavelength, converting the detected spectrum data for each wavelength into a spectrum value as a function of a wavelength that a refractive index is reflected, and detecting a position where the intensity of the reflective light has a peak as a thickness of a spacer layer and a cover layer respectively by converting the converted value into a length of an interference area for representing a layer thickness of the optical disc by the Fast Fourier Transform. The disclosed method has advantages for high precisely measuring thickness of an optical disc.

13 Claims, 9 Drawing Sheets

METHOD FOR MEASURING THICKNESS OF AN OPTICAL DISC

DOMESTIC PRIORITY INFORMATION

This application claims the benefit of the Korean Application No. P2003-40312 filed on Jun. 20, 2003, the entire contents of which are hereby incorporated by reference.

BACKGROUND OF THE INVENTION

1. Field of the Invention

The present invention relates to a method for measuring thickness of an optical disc.

2. Description of the Related Art

Various recording media exist, such as a magnetic recording tape, a Laser Disc (LD) and a Compact Disc (CD) as optical discs, and a Digital Video Disc (hereinafter referred to as DVD) that have the capacity to record vast amounts of information. Since the optical disc, as compared with other recording media, utilizes a different digital recording system, is light weight, and is convenient to keep and carry, many users prefer the optical disc over other recording media.

Moreover, recording media are under development with higher density and higher integration. For example, a Blu-ray Disc (BD) as a High Density DVD (HD-DVD) has a higher integration than current DVDs.

As new optical discs are developed, methods for manufacturing these products are also being developed and improved. Production of a reliable and high quality optical disc presents unique challenges since minute signal characteristics associated with inferior quality may originate from errors in thickness of a disc, scratches, deformities, fingerprints, and attachment of foreign material to the optical disc during manufacturing of the product.

In particular, thickness variations of a disc is a major factor affecting product quality and reliability. Thus, it is necessary to measure the thickness in real time for processing control during manufacturing.

An optical disc may be treated in a manner similar to a thin film. If the thickness of the thin film is under several μm, the measurement of the thickness depends on a quantitative measurement such as a thin film analysis by ellipsometry and measurement of a reflection factor. If the thickness of a relatively thick thin film equal to or greater than several μm is analyzed, the thickness may be measured by a vibration period appearing in a reflective or transparent spectrum due to an interference effect.

The thickness of a thin film may be measured by obtaining a vibration period (or frequency) of the spectrum by the interference and determining the thickness of the thin film from the obtained vibration period. However, as thin films become thick, the time necessary to estimate the thickness of the thin film increases. In order to rapidly measure the thickness of thick thin films, a conventional Fast Fourier Transform (hereinafter referred to as "FFT") is utilized as a rapid measurement of the vibration period of the spectrum.

Figure 1:
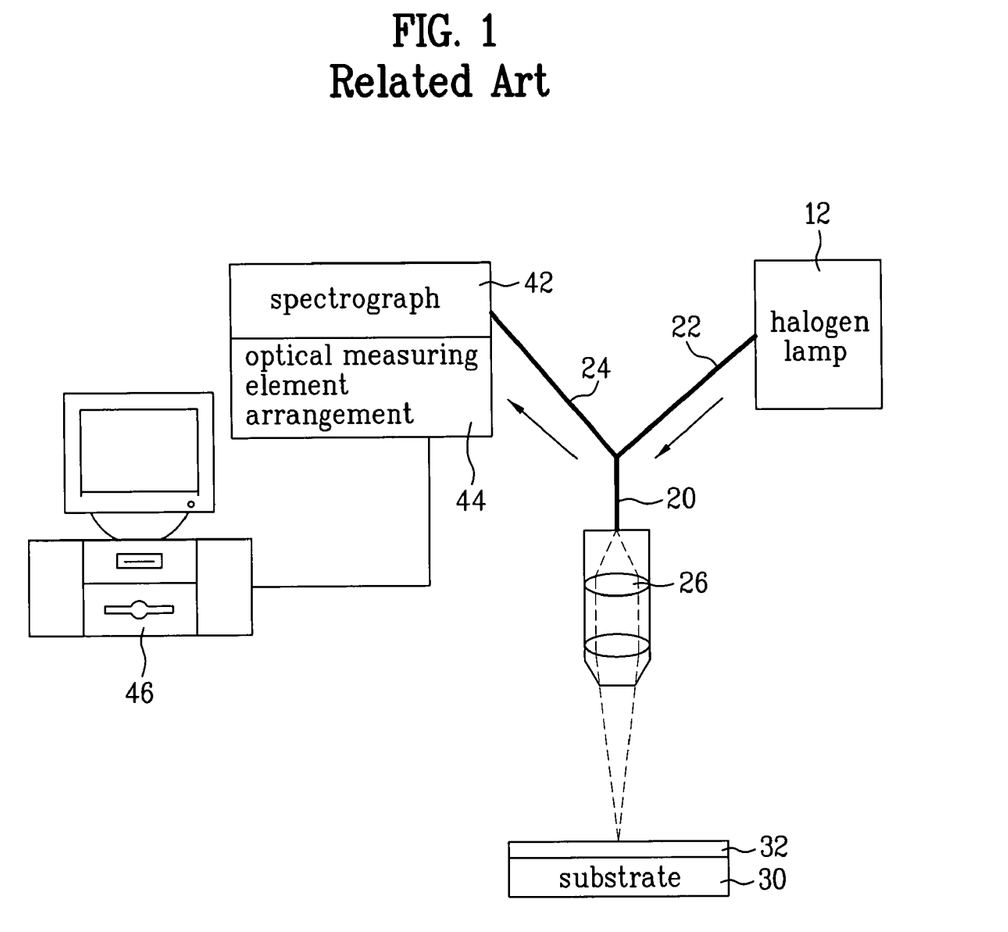
FIG. 1 illustrates a schematic construction of an apparatus for measuring thickness of a thin film of an optical disc according to a related art.

FIG. 1 is a schematic of a conventional apparatus for measuring the thickness of a thin film.

As illustrated in FIG. 1, the apparatus measures the thickness of a thin film by measuring a reflectivity spectrum. Light from a halogen lamp 12 is projected on a substrate 30 with a thin film 32 through an optical fiber 22 and a lens 26, which is assigned in a perpendicular direction with respect to the recording surface of the optical disc. Light reflected from the substrate 20 is transmitted to a spectrograph 42 through the lens 26 and the optical fiber 24. The spectrograph 42 splits the light reflected from a surface of a sample on the substrate 30 according to the intensity of each wavelength. The split light is then directed to an optical measuring element arrangement 44 that supplies the luminance intensity at each wavelength to a computer 46. The computer 46 determines the thickness of the thin film using luminance intensity information at each wavelength as spectrum data.

Figure 2A:
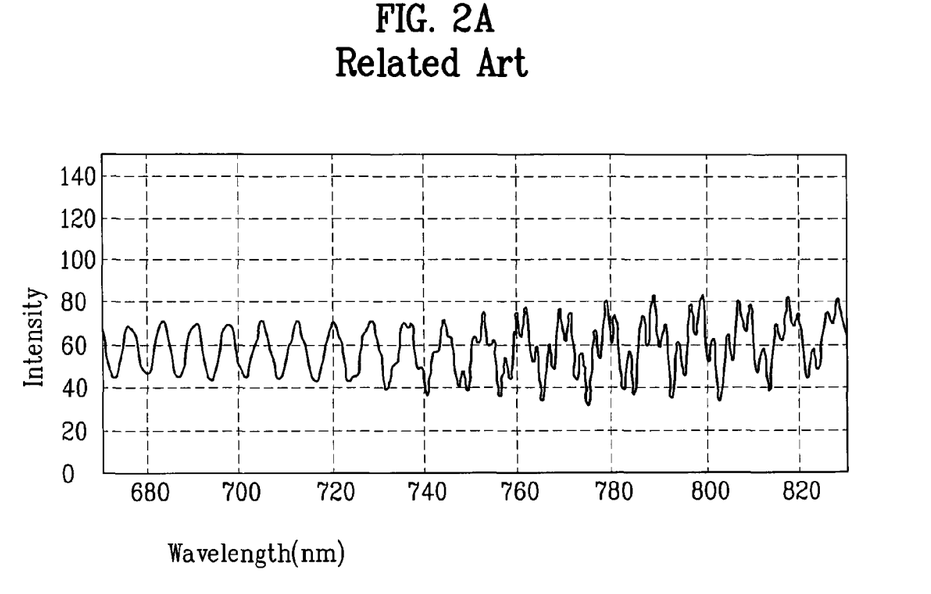
FIG. 2A illustrates a graph showing a luminous intensity in each wavelength supplied to a computer according to the related art.
Figure 2B:
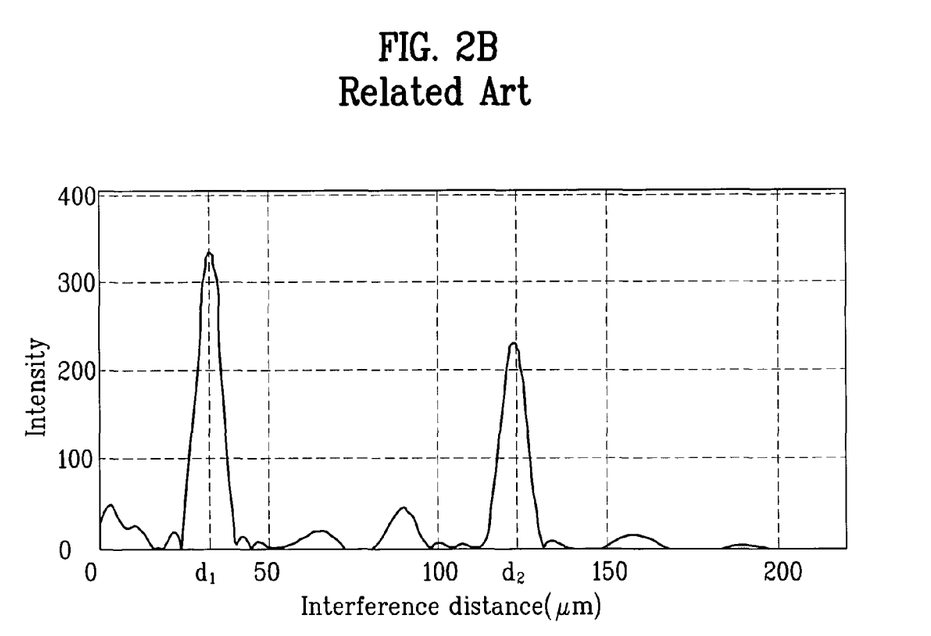
FIG. 2B illustrates a graph of Fast Fourier Transform of the reflectivity spectrum by using FIG. 2A.

FIGS. 2A and 2B are views illustrating how a refractive index may be used to determine the thickness of an optical disc measured by a conventional method. FIG. 2A is a graph showing a luminous intensity data spectrum at each wavelength according to the conventional method. FIG. 2B is a graph of a Fast Fourier Transform of the reflectivity spectrum based on the data of FIG. 2A.

As illustrated in FIGS. 2A and 2B, since $\Delta\lambda$ can be selected, where $\Delta\lambda$ is m times with respect to a specific wavelength $\alpha$ and m−1 times with respect to near wavelength $\lambda+\Delta\lambda$, the thickness d of a specific layer in the spectrum data according to the refractive index may be represented by the following equation 1.

At the condition $\Delta\lambda<<\lambda$, $2nd=m\lambda=(m-1)(\lambda+\Delta\lambda)$, and if expanded, $m\lambda=(m-1)(\lambda+\Delta\lambda)=m\lambda+m\Delta\lambda-(\lambda+\Delta\lambda)$ $m\Delta\lambda=\lambda+\Delta\lambda$ [Equation 1]

therefore, becomes $m=(\lambda+\Delta\lambda)/\Delta\lambda$, where, $2nd=m\lambda=\lambda(\lambda+\Delta\lambda)/\Delta\lambda\approx\lambda^2/\Delta\lambda=1/\lambda(1/\lambda)$ Since multiplication of 2nd and $\Delta(1/\lambda)$ is 1 (one), if, in the experiment, a relationship function between the reflectivity intensity and $\Delta(1/\lambda)$ can be obtained, an FFT function with respect the 2nd corresponding to transform factor of $\Delta(1/\lambda)$ by taking the FFT wholly.

Thus, a d value, where a peak appears, is the thickness to be determined.

For reference, the description for the FFT is represented to a generalized equation as follows.

A relationship equation between the intensity I and the wavelength $\lambda$ becomes $I=f(\lambda)=g(\Delta(1/\Delta))$.

If applying the FFT to both sides, then the equation can be expressed as following equation 2.

$$FFT\{I\} = FFT\left\{g\left(\Delta\left(\frac{1}{\lambda}\right)\right)\right\} = \int g\left(\Delta\left(\frac{1}{\lambda}\right)\right)e^{-2\pi i(\Delta(\frac{1}{\lambda}))2nd}d(2nd) = h(2nd).$$ [Equation 2]

However, since the conventional method does not consider the refractive index dispersion of thin film material, the gap between peaks decreases gradually. More especially, according to the conventional art, there are disadvantages since the refractive index is varied depending upon the wavelength, thickness values obtained according to the refractive index for dividing a Fourier peak position are varied and reduction of size and increment of a width of the peak are caused.

Thus, since the materials of an actual thin film have a wavelength dependant on the refractive index, that is, since there is a refractive index dispersion of the thin film, the energy difference caused by the interference between two lights at a frequency period is not uniform. For this reason, the width of the peak that is obtained using the Fast Fourier Transform from the reflective spectrum is wider according to the degree of the refractive index dispersion. Furthermore, the error in ascertaining the thickness of the thin film because of the imprecise position of the peak increases. Therefore, in order to precisely measure the thickness of the thin film, the refractive index dispersion should be considered.

SUMMARY OF THE INVENTION

Accordingly, the present invention is directed to a method for measuring thickness of an optical disc that addresses one or more problems due to limitations and disadvantages of the related art.

An object of the present invention is to provide a method for precisely measuring the thickness of an optical disc with a rapid speed by using a position of peak value of a reflected light in an interference area obtained by Fast Fourier Transform of a variation of refractive index according to a wavelength, that is, a spectrum being reflected with the refractive index as a function of the wavelength.

Another object of the present invention is to provide an improved method for precisely measuring thickness of an optical disc by keeping accuracy of determining a peak position as well as preventing the expansion of a width of the peak when the Fourier Transform even when a reflecting film is formed on a substrate at a uniform area ratio by a reflective light or multiple thin films are formed on the substrate.

Another object of the present invention is to provide a method for precisely measuring thickness of an optical disc to be applicable not only a reflective index spectrum but also any other spectrum vibrated by an interference of a thick thin film such as a transmittance spectrum.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an example embodiment of the invention is directed to a method for measuring thickness of an optical disc by using an interference effect of the optical disc layer, including the steps of detecting an intensity of a reflective light according to a wavelength of a light as a spectrum data for each wavelength, converting the detected spectrum data for each wavelength into a spectrum value as a function of a wavelength that a refractive index is reflected, and detecting a position where the intensity of the reflective light has a peak as a thickness of a spacer layer and a cover layer respectively by converting the converted value into a length of an interference area for representing a layer thickness of the optical disc by the Fast Fourier Transform.

In another example embodiment of the present invention, the spectrum value as a function of a wavelength that a refractive index is reflected prefers to be $n(\lambda)/2\lambda$.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the example embodiments of the present invention that are illustrated in the accompanying drawings.

Figure 3:
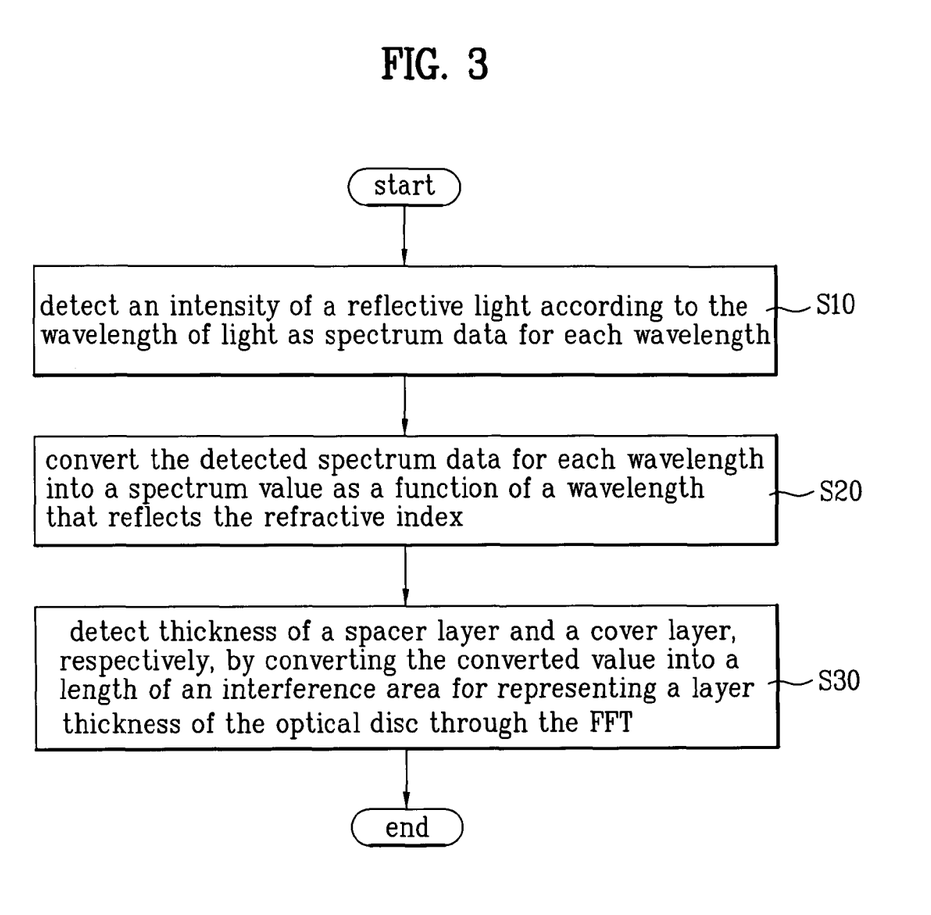
FIG. 3 illustrates a flowchart showing a method for measuring thickness of an optical disc according to the present invention.
Figure 4:
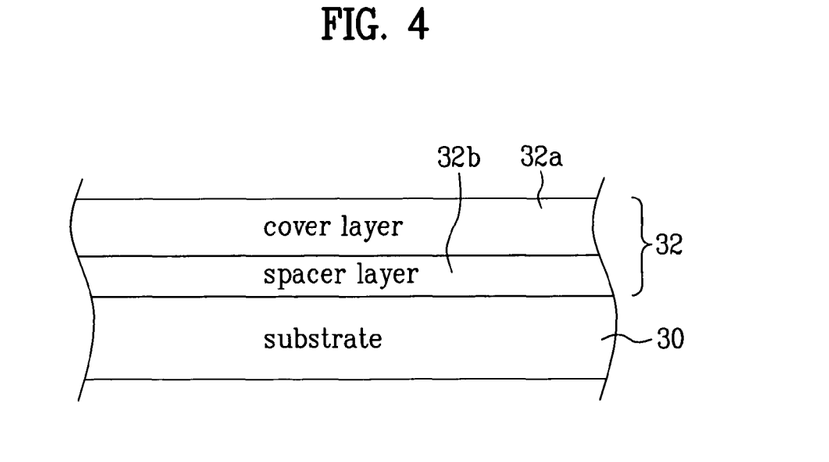
FIG. 4 illustrates a lateral constructive view of an optical disc for a High Density-DVD according to the present invention.
Figure 5A:
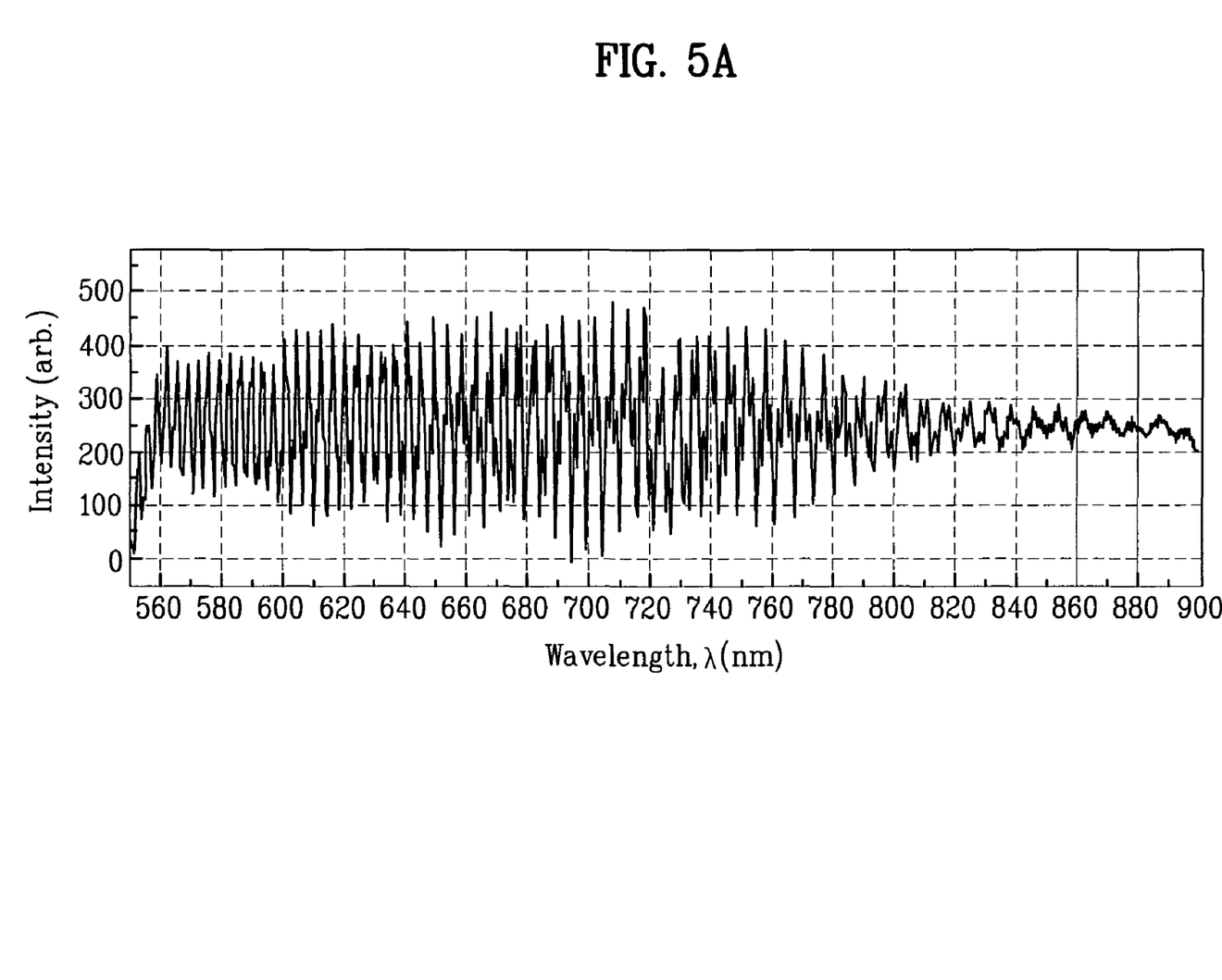
FIG. 5A illustrates a graph showing spectrum data by wavelength by measuring an intensity of a reflective light according to a wavelength of a light according to the present invention.
Figure 5B:
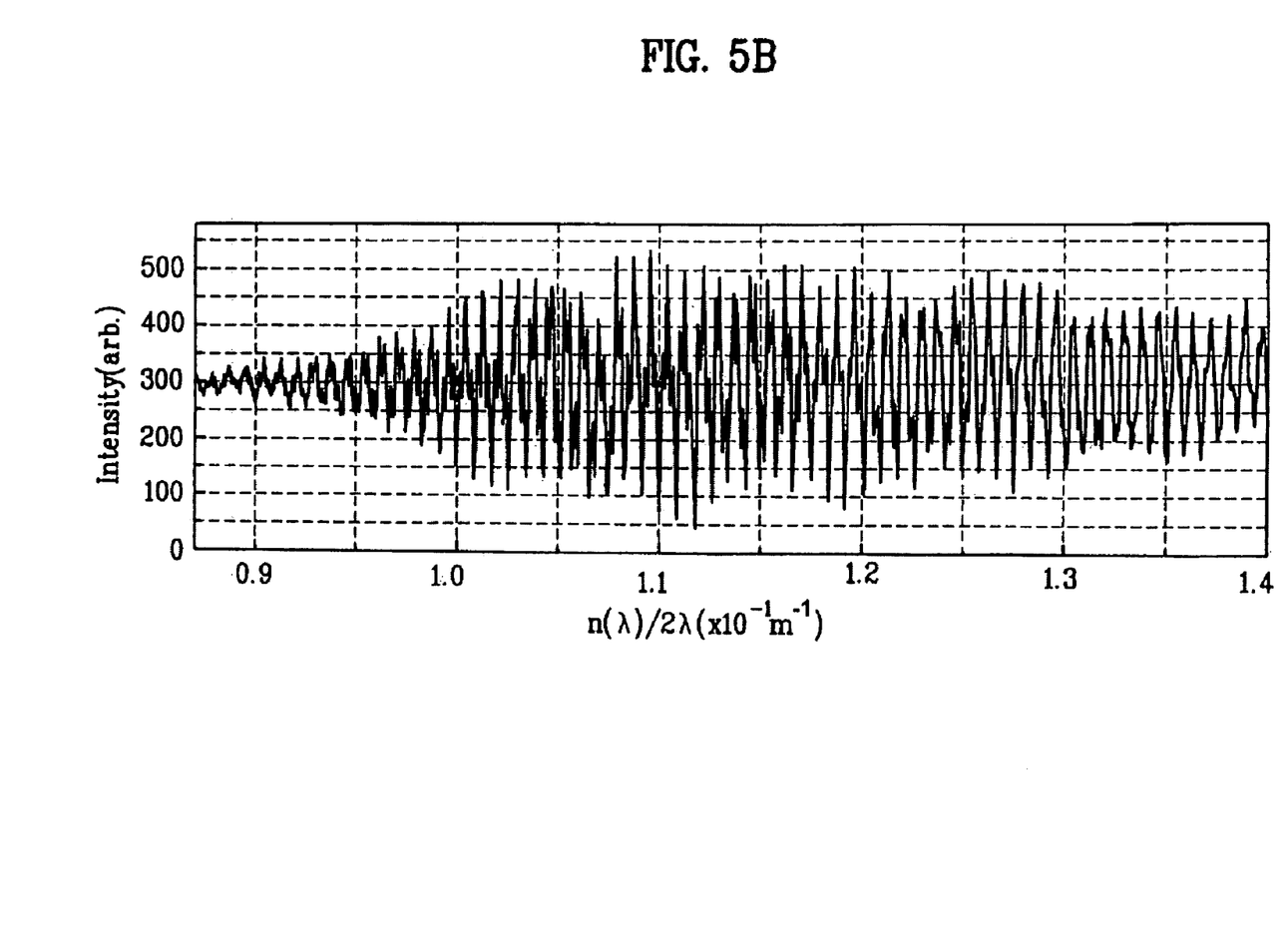
FIG. 5B illustrates a graph setting the reflective light as a vertical axis and a value that a refractive index is reflected by a function of a wavelength as a horizontal axis by using FIG. 5A.
Figure 5C:
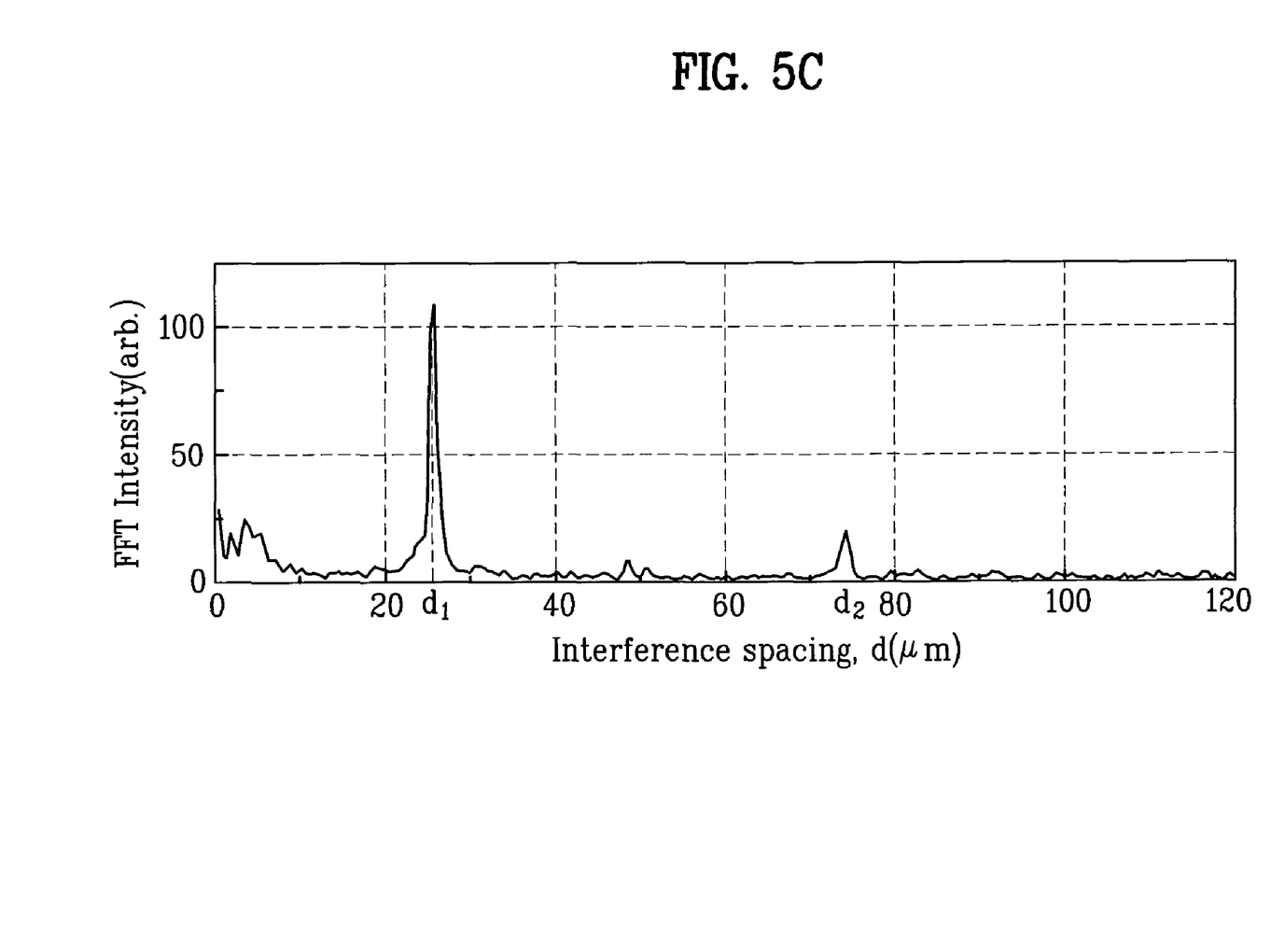
FIG. 5C illustrates a Fast Fourier Transform graph of the spectrum by wavelength by using FIG. 5B.

FIG. 3 illustrates a flowchart showing a method for measuring the thickness of an optical disc according to the present invention. FIG. 4 illustrates a lateral constructive view of an optical disc for a High Density-DVD according to an example embodiment of the present invention. FIG. 5A is a graph showing spectrum data comparing wavelength with intensity of a reflective light. FIG. 5B is a graph setting the reflective light as a vertical axis and a value that a refractive index is reflected by a function of a wavelength as a horizontal axis using the data of FIG. 5A. FIG. 5C is a Fast Fourier Transform graph of the spectrum by wavelength using the data of FIG. 5B.

FIG. 4 illustrates an optical disc such as a High Density DVD (hereinafter referred to 'HD-DVD'). As illustrated in FIG. 4, the layers of the HD-DVD include a cover layer (CL) 32a of a thickness about 80 µm and a spacer layer (SL) 32b having thickness of 10 µm, below the cover layer 32a. The cover layer 32a and spacer layer 32b are supported by substrate 30. Additional layers may occur in the optical disc beyond the three specifically identified.

An apparatus for measuring thickness of the optical disc, as illustrated in FIG. 1, includes a light source, an optical fiber, a lens, a substrate with a thin film, a monochromator, an optical measuring element arrangement, and a computer.

Using the optical disc thickness measuring apparatus as described above, raw data for determining the thickness of the optical disc such as an HD-DVD may be obtained. Detected variations, according to changes in wave length, of the intensity of a reflective light are treated as a first spectrum of data (Step S10). An example of first spectrum data is illustrated in FIG. 5A.

The first spectrum data is then converted into a second spectrum of values that is a function not only of a wavelength but also of the refractive index (Step S20).

An equation for converting the first spectrum into the second spectrum may be expressed by the following Equation 3.

$$2n(\lambda)d = m\lambda$$

$$2n(\lambda + \Delta\lambda)d = (m-1)(\lambda + \Delta\lambda)$$

If developing the above second equation, then $$2n(\lambda)d + 2\Delta nd = m\lambda + m\Delta\lambda - \lambda - \Delta\lambda$$

where, $\Delta n = n(\lambda + \Delta\lambda) - n(\lambda)$, if substituting the upper equation into the first equation and developing the substituted first equation, then $$m = (2\Delta nd/\Delta\lambda) + (\lambda + \Delta\lambda)/\Delta\lambda \rightarrow \text{if substituting the first equation, then}$$

$$2n(\lambda)d = (2\Delta\lambda nd/\Delta\lambda) + ((\lambda + \Delta\lambda)\lambda/\Delta\lambda)$$

$$2(n(\lambda) - \lambda\Delta n/\Delta\lambda)d = (\lambda + \Delta\zeta)\lambda/\Delta\lambda$$

$$(2\lambda^2/\Delta\lambda)((n(\lambda)\Delta\lambda - \lambda\Delta n)/\lambda^2) = (\lambda + \Delta\lambda)\lambda/\Delta\lambda$$

$$2\lambda(n(\lambda)/\lambda)d = (\lambda + \Delta\lambda)/\lambda = 1 + \Delta\lambda/\lambda \approx 1 (\Delta\lambda/\lambda << 1) \quad \text{[Equation 3]}$$

where, the latest term can be neglected by applying a first order approximation.

By using the function relationship with respect to $\lambda(n(\lambda)/\lambda)$ of the intensity of the light obtained according to the equation as described above, the apparatus can obtain the second spectrum which is a function of the refractive index and separately also is a function of wavelength. In this regard, FIG. 5B illustrates an example of a graph that plots the intensity of reflective light as a vertical axis and a value $n(\lambda)/2\lambda$ as a horizontal axis. In other words, in the plot of FIG. 5B, intensity varies according to a first factor that is the index of refraction n and a separate second factor that is $\lambda$. It is noted that the index of refraction is a function of $\lambda$, namely $n(\lambda)$.

Finally, if the converted data in the Step S20 is converted into a length of an interference area for representing the thickness of the optical disc through the Fast Fourier Transform, then the positions are determined where the intensity of the reflected light has a peak value. The position of each detected peak value becomes the thickness of the spacer layer and the cover layer (Step S30).

FIG. 5C illustrates a graph having a vertical axis of the intensity of the light determined by the Fast Fourier Transform and a horizontal axis of the interference area representing the thickness.

As illustrated in FIG. 5C, a peak value occurs at a position $d_1$ on the horizontal axis. This value appears when a refractive index $n_1$ with respect to the spacer layer is expressed as a function of wavelength of $n_1(\lambda)$ and converted by the Fast Fourier Transform. This peak value represents the thickness of the spacer layer of the optical disc. Meanwhile, a peak value at position $d_2$ on the vertical axis is a value that occurs when a refractive index $n_2$ with respect to the cover layer is expressed as a function of wavelength of $n_2(\lambda)$ and converted by the Fast Fourier Transform. This peak value represents the thickness of the cover layer of the optical disc.

The measurement of the thickness of the optical disc by using the Fast Fourier Transform by reflecting the refractive index into a function of wavelength will be described in detail through experimental values associated with measurement of the thickness of a thin film.

Figure 6:
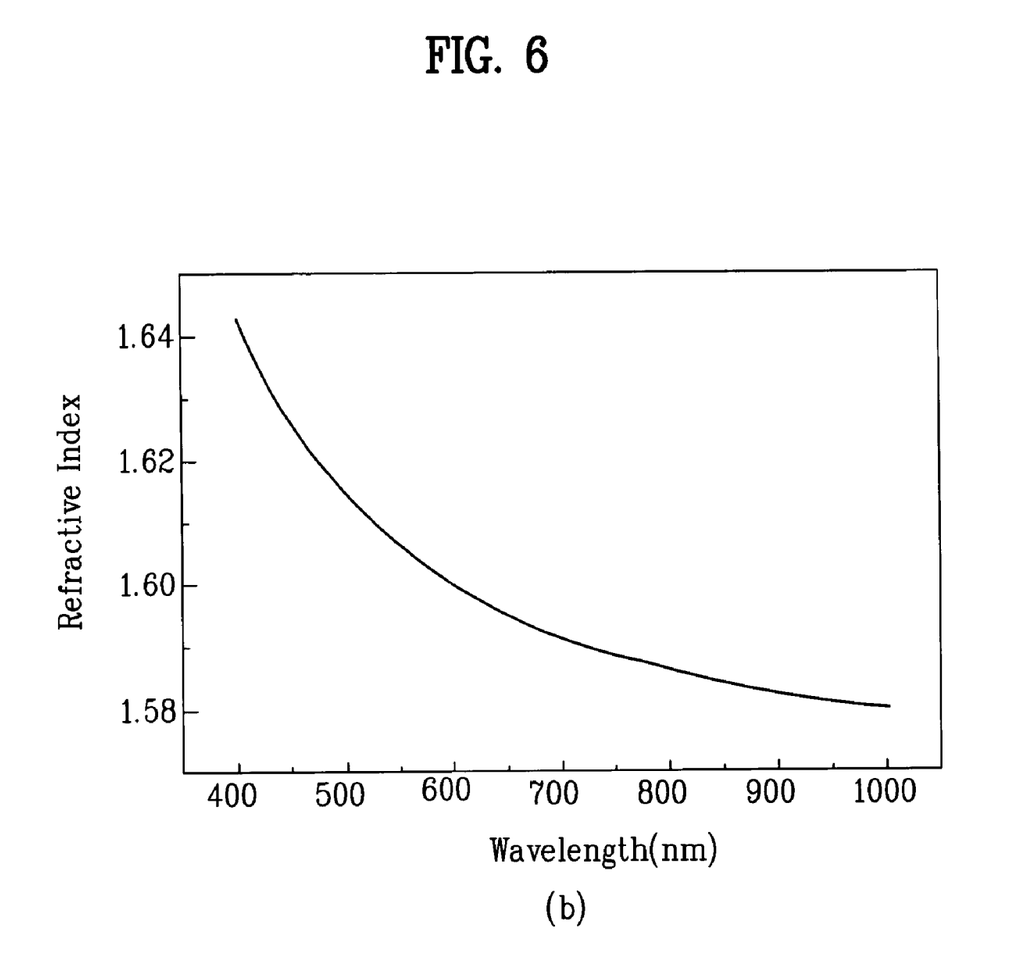
FIG. 6 illustrates a graph showing a refractive index dispersion curve of a dielectric thin film with a thickness 30 µm.

FIG. 6 illustrates a graph showing a refractive index dispersion curve of a dielectric thin film with a thickness of 30 μm.

As illustrated in FIG. 6, by reflecting the refractive index dispersion when the Fast Fourier Transform is performed, it can be understood that the peak width decreases and the peak size increases through the reflectivity spectrum analysis by the dielectric thin film with a thickness of 30 μm. At that time, the dielectric thin film is defined as sole thin film to exist in ambient without a substrate layer for supporting the dielectric thin film.

Figure 7A:
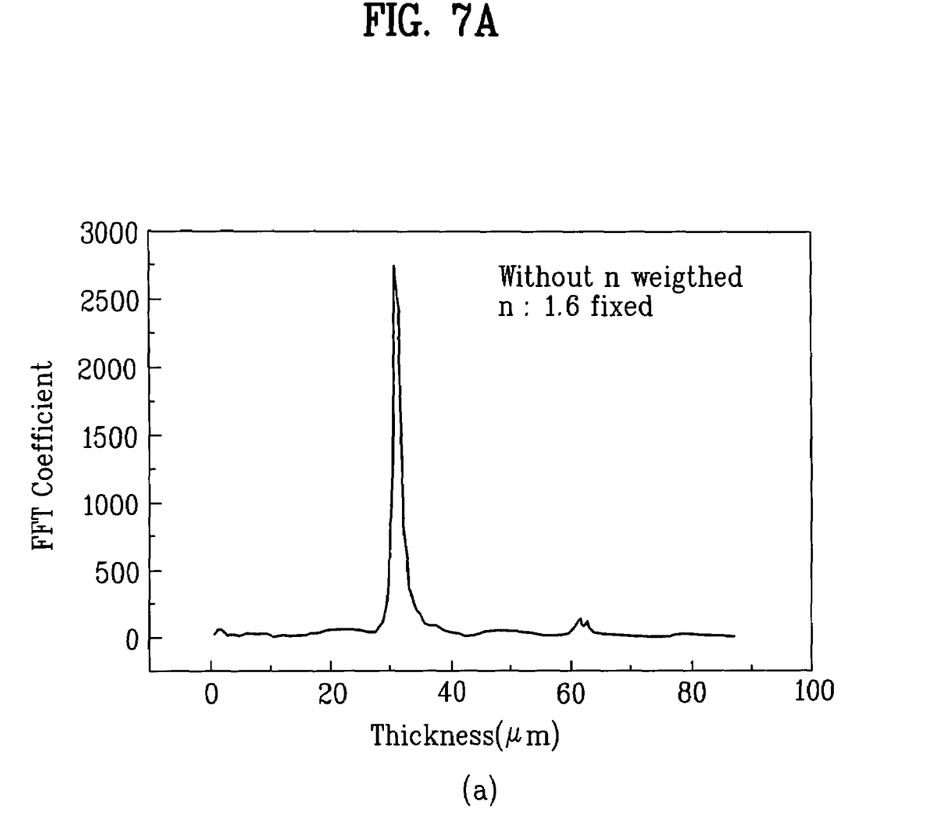
FIGS. 7A and 7B illustrate graphs showing intervals between the reflective spectrums with respect to energy through whether the refractive index dispersion of the dielectric thin film is considered or not.
Figure 7B:
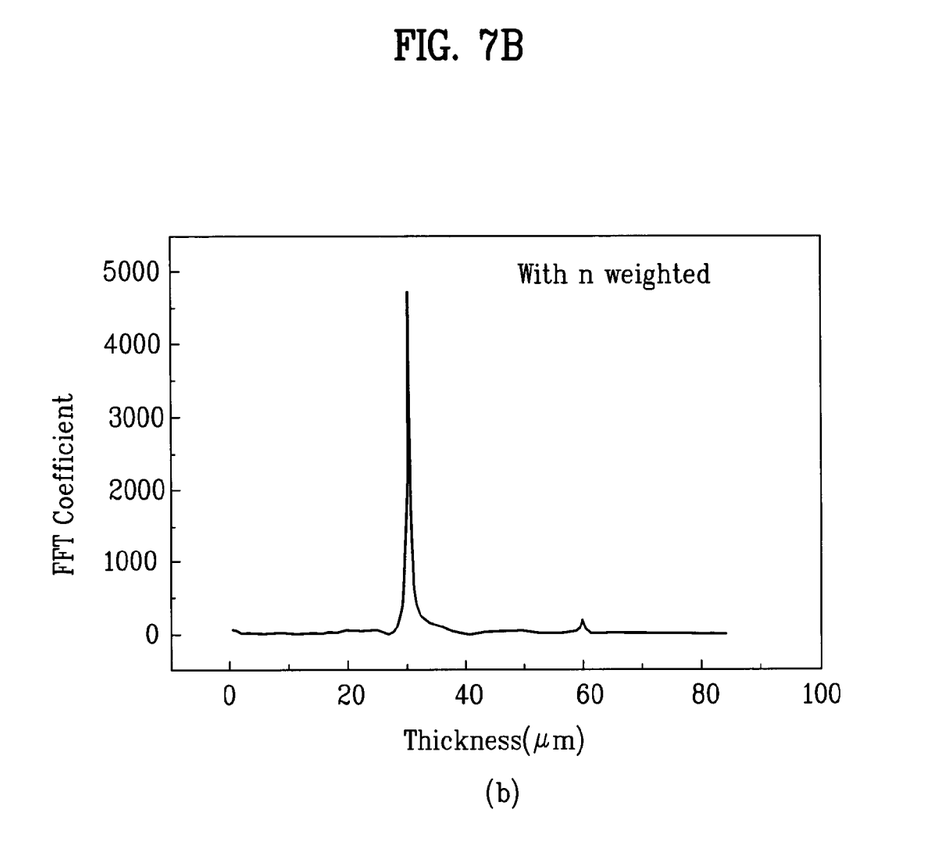

This fact appears more remarkably after applying the Fast Fourier Transform to cases whether the refractive index is both reflected and not reflected. Referring to FIGS. 7A and 7B, FIG. 7A illustrates a Fast Fourier Transform graph of the reflective spectrum when the refractive index dispersion of the dielectric thin film is not considered. FIG. 7B illustrates a Fast Fourier Transform graph of the reflective spectrum when the refractive index dispersion of the dielectric thin film is reflected as a function of wavelength.

As illustrated in FIGS. 7A and 7B, in a Fast Fourier Transform graph when the refractive index dispersion is reflected, the peak width largely decreases from 1.61 μm, to 0.44 μm, while the peak size increases about 1.7 times. These increments of the peak size and decrements of the peak width are reasonable from which a vibration interval of the reflective index spectrum becomes uniform when the refractive index dispersion is reflected so that it clearly represents the effect of the Fast Fourier Transform considering the refractive index.

Another effect obtained when the refractive index dispersion is considered appears at a thickness value obtained after the Fast Fourier Transform. FIG. 7A illustrates a graph having a horizontal axis with the thickness by fixing the refractive index to n=1.6 and performing the Fast Fourier Transform. Since the dielectric thin film has different refractive index according to the wavelength as illustrated in FIG. 6, the obtained thickness value varies according to the refractive index for dividing a Fourier peak position.

Therefore, the thickness value 30.71 μm estimated from the peak in FIG. 7A is different from the actual thickness 0.71 μm. This occurs since the refractive index of n=1.6 does not properly reflect an effective refractive index of the reflectivity spectrum ranges in the region of 500 nm to 900 nm. It can be regarded an error since it does not take the refractive index dispersion into consideration.

However, since the refractive index dispersion is precisely reflected in FIG. 7B illustrating the Fast Fourier transform graph for considering the refractive index dispersion, a precise thickness value of 30.0 μm is estimated so that a rapid analyzing speed and a high precise thickness measurement can be achieved.

As described above, the method for measuring thickness of an optical disc by using the interference effect of the optical disc's layer has advantages as follows.

First, in the measurement of the thickness of the optical disc through the peak value position of the reflected light in the interference area obtained by the Fast Fourier Transform of the reflectivity spectrum in which the refractive index dispersion of the thin film is reflected by adding an extra refractive index, the measurement of the thickness of the optical disc can be performed precisely while maintaining a rapid analyzing speed, so that the reliability of the measuring apparatus can be increased and the productivity can be also enhanced.

Second, according to the present invention, regardless of type and structure of the disc, a reflective layer of uniform area ratio formed on a substrate, or multiple layer thin film formed on the substrate, the thickness of the optical disc can be measured with a high precision and a rapid analyzing speed. The measuring method of the present invention can also be applied to a spectrum having a vibration by the interference of the thick thin film such as a transmittance spectrum having real-time measurement with precise analysis.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for measuring thickness of one or more layers of an optical disc that includes a spacer layer and a cover layer by using an interference effect of an optical disc layer, the method comprising the steps of:
    detecting an intensity of a reflective light according to a plurality of wavelengths as a first spectrum of data;
    converting the first spectrum data into a second spectrum values that exhibits variation as a function of wavelength and refractive index;
    transforming the second spectrum using a Fast Fourier Transform; and
    detecting thickness of one or more of the spacer layer and the cover layer, respectively, based upon the transformed spectrum.

2. The method of claim 1, wherein in said converting step, the second spectrum is a function of $n(\lambda)/2\lambda$, where n is the index of refraction and $\lambda$ is wavelength.

3. The method of claim 1, wherein the spacer layer has a refractive index $n_1$ and the cover layer has a refractive index $n_2$ different from the refractive index n1.

4. The method of claim 3, wherein peak values of intensity of the transformed spectrum at positions $d_1$ and $d_2$ indicate $d_1$ and $d_2$ as being the thicknesses of respective layers.

5. The method of claim 1, wherein in said converting step, an equation for processing the first spectrum is expressed as following:

$$2n(\lambda)d = m\lambda$$

$$2n(\lambda+\Delta\lambda)d = (m-1)(\lambda+\Delta\lambda)$$

wherein, d is a thickness, n is a refractive index of the optical disc layer, $\lambda$ is wavelength, and m is integer value.

6. The method of claim 1, wherein the transformed spectrum represents intensity as a function of a length (d) of an interference area, and the length d further represents a thickness of a given layer.

7. The method of claim 1, wherein the second spectrum varies as a function of a first factor that is the index of refraction and a separate second factor that is the wavelength.

8. The method of claim 7, wherein the second spectrum varies as a function of the following equation, $$n/b\lambda$$

where $\lambda$ is the wavelength and is the second factor,
where n is the index of refraction and is the first factor and is itself a function of $\lambda$, and
where b is an integer.

9. The method of claim 1, wherein, for said converting step, the refractive index is dependent on wavelength.

10. A method for measuring thickness of one or more layers of an optical disc by using an interference effect, the method comprising:
    measuring intensities of reflected light according to a plurality of wavelengths and providing the same as a first set of intensities that vary as a function of wavelength;
    converting the first set into a second set of intensities that varies as a function of the index of refraction as well as the wavelength;
    frequency-transforming the second set; and
    determining a thickness of one or more layers of the optical disc based upon the transformed set.

11. The method of claim 10, wherein the second spectrum varies as a function of a first factor that is the index of refraction and a separate second factor that is the wavelength.

12. The method of claim 11, wherein the second spectrum varies as a function of the following equation, $$n/b\lambda$$

where $\lambda$ is the wavelength and is the second factor,
where n is the index of refraction and is the first factor and is itself a function of $\lambda$, and
where b is an integer.

13. The method of claim 10, wherein, for said converting step, the refractive index is dependent on wavelength.

* * * * *